United States Patent
Gribetz

(10) Patent No.: US 10,229,313 B1
(45) Date of Patent: Mar. 12, 2019

(54) SYSTEM AND METHOD FOR IDENTIFYING AND TRACKING A HUMAN HAND IN AN INTERACTIVE SPACE BASED ON APPROXIMATED CENTER-LINES OF DIGITS

(71) Applicant: Meta Company, San Mateo, CA (US)

(72) Inventor: Yishai Gribetz, Belmont, CA (US)

(73) Assignee: Meta Company, San Mateo, CA (US)

( * ) Notice: Subject to any disclaimer, the term of this patent is extended or adjusted under 35 U.S.C. 154(b) by 0 days.

(21) Appl. No.: 15/791,229

(22) Filed: Oct. 23, 2017

(51) Int. Cl.
- *G06K 9/00* (2006.01)
- *G06F 3/01* (2006.01)
- *G06T 7/73* (2017.01)
- *G06T 7/50* (2017.01)
- *G06K 9/46* (2006.01)
- *G06T 7/13* (2017.01)

(52) U.S. Cl.
CPC .......... *G06K 9/00375* (2013.01); *G06F 3/011* (2013.01); *G06F 3/017* (2013.01); *G06K 9/4604* (2013.01); *G06T 7/13* (2017.01); *G06T 7/50* (2017.01); *G06T 7/73* (2017.01); *G06K 9/00355* (2013.01); *G06K 9/4652* (2013.01); *G06T 2207/10028* (2013.01)

(58) Field of Classification Search
CPC ....... G06F 3/017; G06K 9/00375; G06K 9/48
See application file for complete search history.

(56) References Cited

U.S. PATENT DOCUMENTS

| | | | |
|---|---|---|---|
| 8,274,535 B2 | 9/2012 | Hildreth | |
| 8,351,651 B2 | 1/2013 | Lee | |
| 9,304,594 B2 | 4/2016 | Finocchio | |
| 9,469,558 B2 | 10/2016 | Regmi | |
| 9,665,767 B2 | 5/2017 | Guan | |
| 9,772,679 B1 | 9/2017 | Schiewe | |
| 2003/0185445 A1* | 10/2003 | Chang | G06F 3/017 382/203 |
| 2011/0080490 A1 | 4/2011 | Clarkson | |
| 2011/0142353 A1 | 6/2011 | Hoshino | |
| 2012/0319945 A1 | 12/2012 | McCarthy | |
| 2013/0278501 A1 | 10/2013 | Bulzacki | |
| 2014/0106816 A1* | 4/2014 | Shimuta | A61B 5/6898 455/556.1 |
| 2014/0337786 A1* | 11/2014 | Luo | G06F 3/0416 715/773 |

(Continued)

*Primary Examiner* — Shaheda Abdin
(74) *Attorney, Agent, or Firm* — Sheppard Mullin Richter & Hampton LLP

(57) ABSTRACT

A system configured for tracking a human hand, e.g., in an interactive space, may comprise a distancing device, one or more physical processors, and/or other components. The distancing device may be configured to generate output signals conveying position information. The position information may include positions of surfaces of real-world objects, including surfaces of a human hand. A group of points may be identified that lie on a candidate surface which is a candidate for being the surface of a hand. The edges of the candidate surface may be detected. The points furthest away from the closest edge may be determined. A model may be created by connecting at least some of these points. Sections of the model are identified that may be a digit of the hand. Per section, fingertips and metacarpophalangeal joints may be identified. The model may be analyzed to determine whether the candidate surface is the surface of a hand.

30 Claims, 12 Drawing Sheets

(56) References Cited

U.S. PATENT DOCUMENTS

| | | |
|---|---|---|
| 2015/0253863 A1 | 9/2015 | Babin |
| 2015/0253864 A1 | 9/2015 | Parkhomenko |
| 2017/0154214 A1 | 6/2017 | Freeman |
| 2017/0235143 A1 | 8/2017 | Chi |

* cited by examiner

SYSTEM AND METHOD FOR IDENTIFYING AND TRACKING A HUMAN HAND IN AN INTERACTIVE SPACE BASED ON APPROXIMATED CENTER-LINES OF DIGITS

FIELD OF THE INVENTION

The system and methods described herein relate to identifying and tracking a human hand in an interactive space based on the approximated center-lines of the digits of a user's hand(s), as they are sensed within the interactive space.

BACKGROUND OF THE INVENTION

There are many types of vision systems that provide hand-based and gesture-based human-computer interaction. In particular, wearable technology such as head mounted displays (HMD) are becoming more popular. Features of the human body may be tracked to facilitate gesture-based input into, e.g., an augmented reality environment.

SUMMARY

The systems and methods described herein facilitate identifying and tracking a human hand, e.g., in an interactive space. In some implementations, a hand may be detected by identifying individual digits of the hand. A distancing device (e.g., a depth sensor) may be configured to generate output signals conveying position information of the hand. The position information may include positions of surfaces of real-world objects, including a user's hands. A group of points may be identified as a candidate surface, which is a candidate for being identified as the surface of a hand. Subsets of this group of points may be identified as a candidate for being a digit. Individual subsets of the group of points may be processed to determine which ends of the identified digits are the fingertips and which ends are metacarpophalangeal joints that connect a digit to the rest of the hand. Based on this information, the system may determine whether the candidate surface is a hand. The position information of the hand may be obtained based on a sampling rate of the distancing device.

In some applications, the presence of an arm is a useful feature for hand detection in the system described herein. For example, a set of points that are a candidate for being the surface of a hand will not float in the air but should be connected to points forming the surface of an arm. However, watches, jewelry, sleeves, and/or other wearable items may prevent accurate detection of the arm surface points. In such cases, hand detection may be performed by processing the group of points that is a hand candidate, and analyzing it without assuming or relying on the presence of an arm.

The interactive space may include one or more of a virtual reality environment, an augmented reality environment, and/or other interactive spaces. An "augmented reality environment," as used herein, may refer to a space that represents a virtual environment that may be superimposed over a perspective of a physical real-world environment around a user. An augmented reality environment may include attributes of a virtual environment, including virtual objects superimposed over portions of the physical environment. A virtual reality environment may refer to a space that includes the virtual environment. The terms "space" and "environment" may be used interchangeably herein.

It is noted that while one or more features and/or functions of the system and method presented here may be directed to interactive spaces, this is for illustrative purposes only and is not to be considered limiting. For example, in some implementations, one or more features and/or functions of the system and method presented may be similarly applied to virtual environments, entertainment and infotainment systems, gesture control of mobile devices, in-vehicle computer systems, and/or other systems and/or environments.

These and other objects, features, and characteristics of the present disclosure, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the any limits. As used in the specification and in the claims, the singular form of "a", "an", and "the" include plural referents unless the context clearly dictates otherwise.

BRIEF DESCRIPTION OF THE DRAWINGS

FIGS. 4-5-6A-6B-6C-6D-6E-7-8A-8B are graphics illustrating (part of) a digit and part of a procedure for identifying a hand in an interactive space, in accordance with one or more implementations.

DETAILED DESCRIPTION

Figure 1:
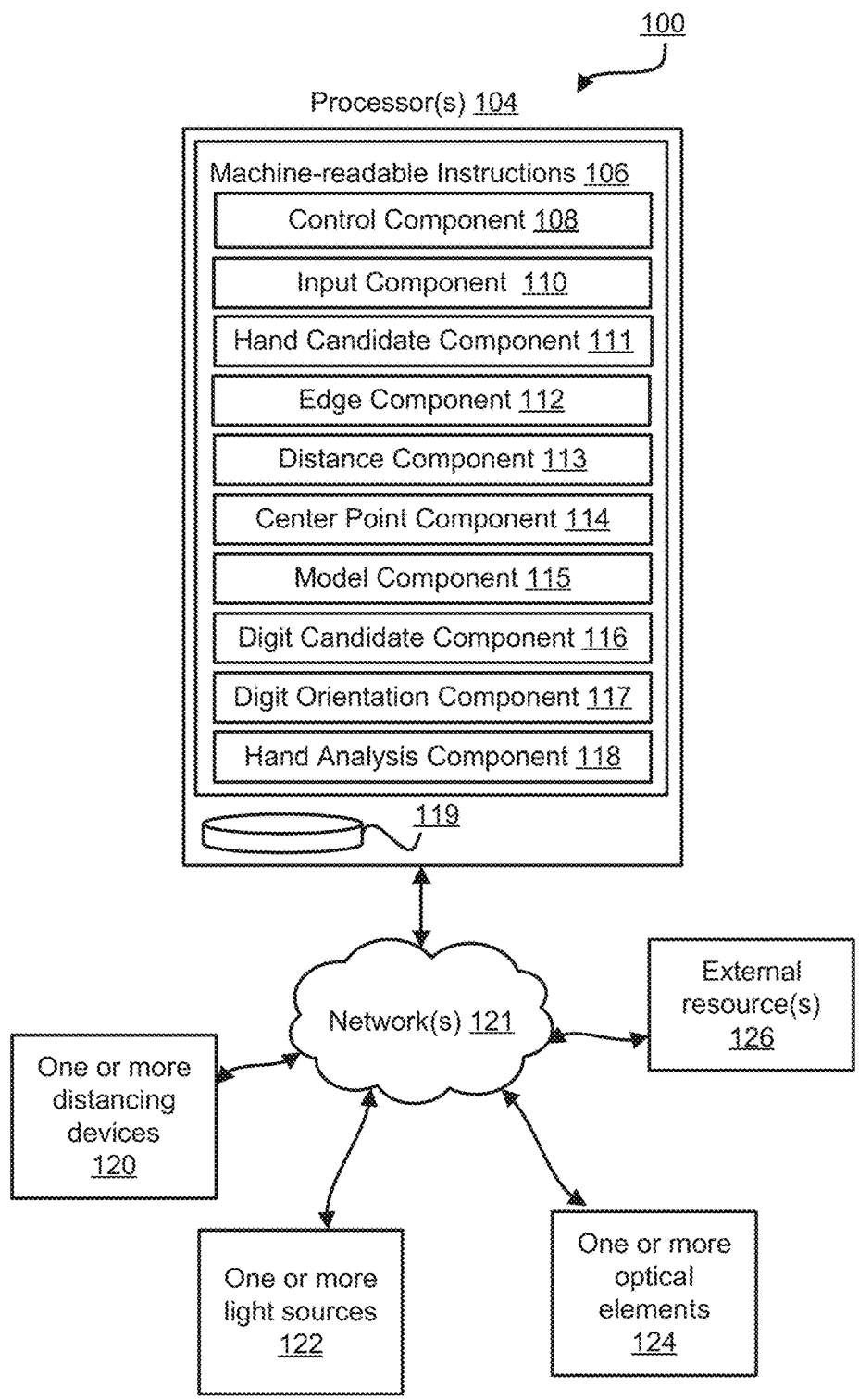
FIG. 1 illustrates a system configured for identifying and tracking a human hand, e.g., in an interactive space, in accordance with one or more implementations.

FIG. 1 shows a system 100 configured for identifying and tracking a human hand, e.g., in an interactive space. The human perceptual system has the ability to combine various sensory cues in an efficient manner in order to perceive physically plausible virtual content in real-world space. For example, the human perceptual system has the ability to integrate, among other things, sensory cues such as one or more of luminance, depth, and/or shape information to form or perceive coherent virtual content in the real-world. As a result, the properties of the human perception may be exploited through visual systems employing hardware and/or software architectures to form virtual content (e.g., digital images) that may be located and/or perceived to be located in real-world space by virtue of the principles of the depth sensitive modules and/or elements of the human brain. The views of virtual content, in addition to the views of the real-world within a user's field-of-view, may define an interactive space.

In some implementations, user input may comprise gesture-based input and/or other input. In some implementations, gesture-based input may be based on identifying and tracking of one or more human features of a user. By way of non-limiting illustration, gesture-based input may be based on tracking one or more of a hand, an arm, a torso, and/or other features of a user. By identifying and tracking a user's hands, gestures including one or more of reaching, grabbing, releasing, touching, swiping, pointing and/or other gestures may be identified. In some implementations, simulated manipulation of virtual content in an interactive space may be based on user input and/or other input. The identified gestures may be provided as input for simulating manipulation of virtual content within a user's field-of-view. For example, an identified gesture may be correlated to a perceived position of a virtual object within a user's field-of-view. The virtual object may be configured to react to the gesture in an interactive manner.

System 100 may include one or more of one or more physical processors 104, one or more distancing devices 120, one or more light sources 122, one or more optical elements 124, electronic storage 119, and/or other components. In some implementations, one or more components of system 100 may be incorporated in a head-mounted display (HMD), and/or other devices. By way of non-limiting illustration, one or more optical elements 124 may comprise at least part of a visor of an HMD. An optical element may comprise one or more reflective, or partially reflective surfaces on a visor. An optical element may be formed from a reflective or partially reflective material. A reflective and/or partially reflective material may comprise one or more of cyclic olefin copolymer (COC) such as ZEONEX®, polycarbonate, polymethyl methacrylate (PMMA), and/or other materials.

In some implementations, individual light sources of one or more light sources 122 may comprise one or more of a liquid crystal display (LCD), a light emitting diode (LED) display, surface-conduction electron-emitter display (SED), a plasma display, an organic light emitting diode (OLED) display, a Micro-Electro-Mechanical Systems (MEMS) mirror based display, liquid crystal on silicon (LCoS) display, digital light projector (DLP), a laser, an RGB laser, and/or other light sources. An individual light source may comprise an array of addressable optical components. Individual optical components may be individually controllable to impact one or more aspects of light to create digital images. By way of non-limiting illustration, individual optical components of a display may be individually controllable to impact one or more of transmissivity, brightness, generation, reflection, refraction, and/or other aspects of light to create images.

A set of components comprising at least one light source 122 and at least one optical element 124 may be referred to herein as an "image-forming component." An image-forming component may be configured to emit light rays, via a light source, forming images of virtual content. When headset 102 is installed on the head of the user, the light rays may be provided, via an optical element 124, to an eye of the user. The images formed by the light rays may be superimposed over views of the real world to create an interactive space.

In some implementations, one or more light sources 122 may be positioned relative to one or more optical elements 124, such that light emitted from one or more light sources 122 may be reflected by one or more optical elements 124 to one or more eyes of the user. The user may perceive the reflected light as virtual content in a perceived three-dimensional light field within their field-of-view. In some implementations, control of position and/or generation of light from individual light sources 122 may impact one or more aspects of a perceived three-dimensional light field and/or virtual content within the perceived the three-dimensional light field. One or more aspects of a perceived three-dimensional light field may include one or more of a perceived distance of the three-dimensional light field from the user, a depth of the perceived three-dimensional light field, and/or other aspects of the three-dimensional light field. One or more aspects of virtual content within a three-dimensional light field may include one or more of a perceived distance of the virtual content from a user, a depth of the virtual content, a size of the virtual content, and/or other aspects of the virtual content. For example, in some implementations, moving a position of an individual light source closer to an optical element may cause virtual content to be perceived closer to the user; while moving the position of the individual light source farther from the optical element may cause the virtual content to be perceived farther from the user.

Figure 10:
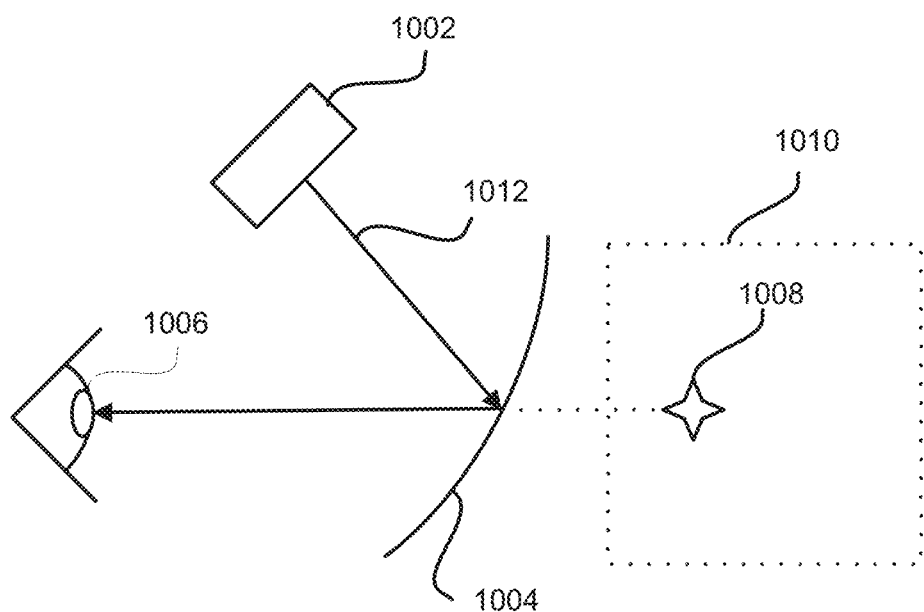
FIG. 10 illustrates an exemplary configuration of a light source and an optical element configured to generate virtual content to be perceived within a field-of-view of a user.

By way of non-limiting illustration, FIG. 10 shows an exemplary configuration of a light source 1002 and an optical element 1004 for generating virtual content 1008 to be perceived within a three-dimensional light field 1010. In some implementations, one or more of light source 1002, optical element 1004, and/or other components may be incorporated into a head-mounted display, and/or other devices. FIG. 10 shows a light beam 1012 emitted from light source 1002. The light beam 1012 may reflect off optical element 1004 into a user's eye 1006. The light beam 1012 may be part of light generated by light source 1002 to depict a digital image. The digital image may correspond to virtual content 1008. In some implementations, position of light source 1002 may be incrementally adjusted to obtain incremental adjustments to a perceived range of virtual content 1008 within three-dimensional light field 1010. In some implementations, the depth and/or bounds of three-dimensional light field 1010 may be limited by an adjustable range of light source 1002 being closer to and/or farther from optical element 1004.

Returning to FIG. 1, individual distancing devices of one or more distancing devices 120 may be configured to generate output signals conveying position information and/or other information. Position information may include depths, distances, and/or positions of one or more surfaces of one or more real-world objects within a real-world environment. The one or more real-world objects may include one or more of the user's hands. The one or more distancing devices 120 may include one or more of a camera, a three-dimensional scanner, a depth sensor, a rangefinder, a laser gauge, a time-of-flight sensor, a volumetric imaging sensor, an IR camera/emitter pair, a passive, structured, or unstructured light stereo pair, and/or other devices.

Figure 3:
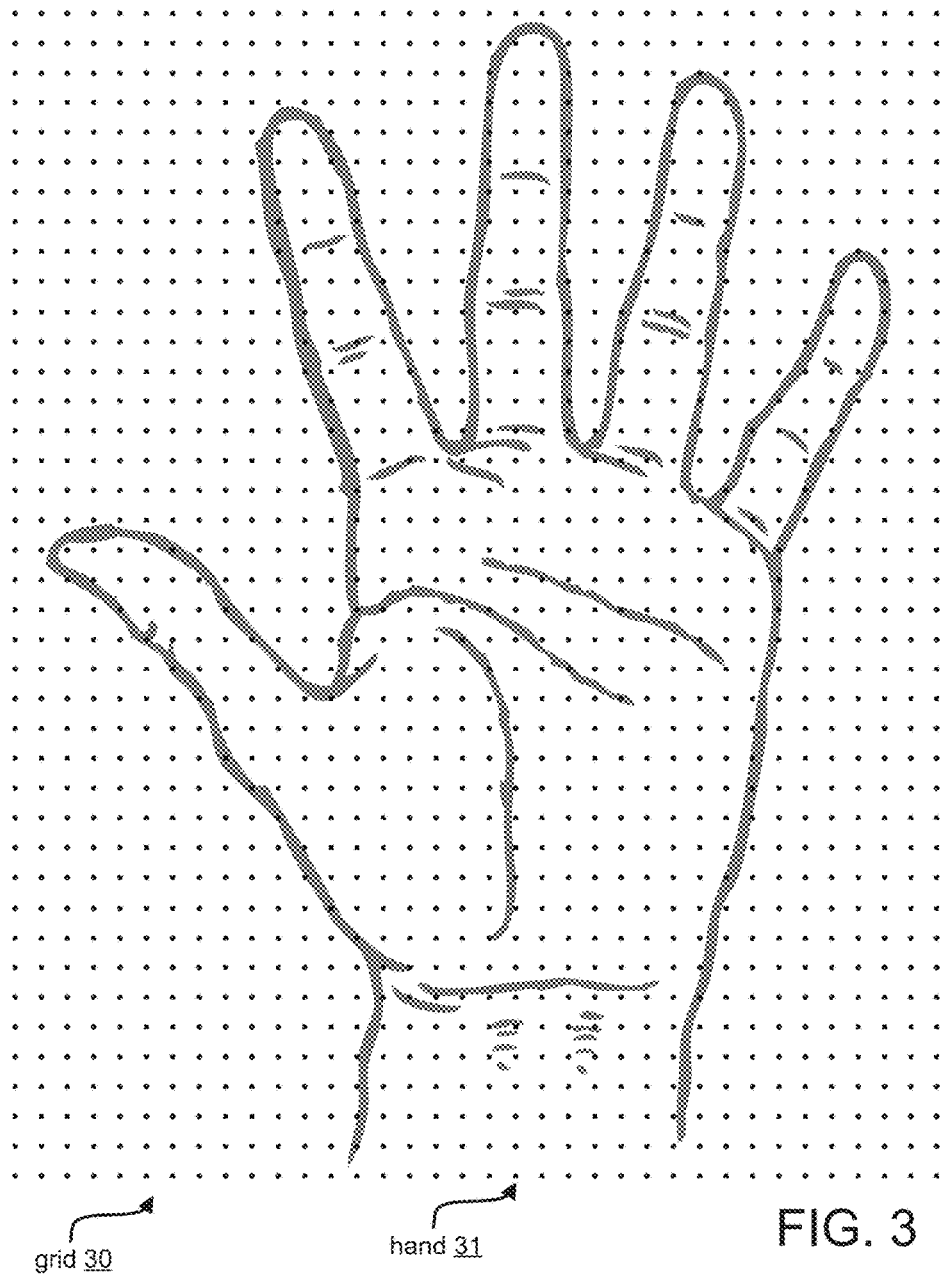
FIG. 3 is a graphic illustrating a hand and part of a procedure for identifying a hand in an interactive space, in accordance with one or more implementations.
Figure 11:
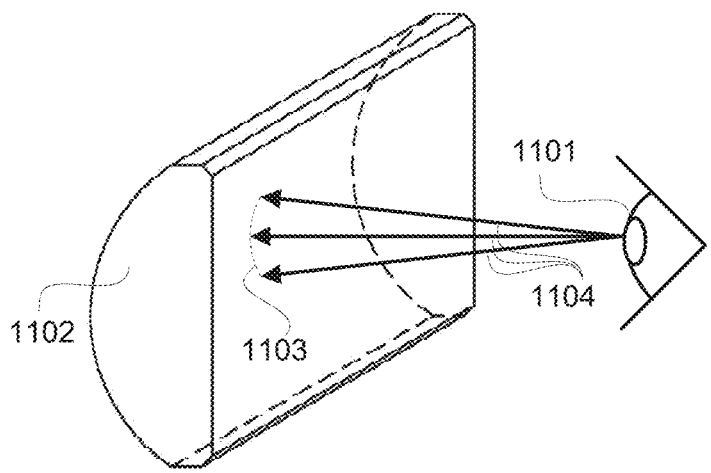
FIG. 11 illustrates an example of a concave cylindrical surface as may be used by a distancing device when capturing output signals that convey position information that is organized in a grid.

In some implementations, individual distancing devices of one or more distancing devices 120 may be configured to generate output signals such that the position information is organized in a grid, e.g., a regular grid. In some implementations, the position information may form a regular grid of points for which depth information has been captured and/or generated. By way of non-limiting example, FIG. 3 illustrates a grid 30 of points for which depth information has been captured and/or generated. As illustrated in FIG. 3, grid 30 may be regular in both horizontal and vertical directions, such that neighboring points along a particular horizontal scanline or capture-line are spaced apart by equal distances for surfaces at the same distance to the distancing device, and further such that neighboring points along a particular vertical scanline or capture-line are spaced apart by equal distances for surfaces at the same distance to the distancing device. In some implementations, the position information may form a regular grid of points when projected on a concave spherical surface for which all parts of the surface have the same distance to a point of origin of the distancing device (e.g., the center of the lens of a distancing device). In some implementations, the position information may form a regular grid of points when projected on a concave cylindrical surface for which all parts of either a horizontal or vertical scanline or capture-line of the surface have the same distance to a point of origin of the distancing device (e.g., the center of the lens of a distancing device), but where the vertical or horizontal scanline or capture-line is a straight line, respectively. By way of non-limiting example, FIG. 11 illustrates a concave cylindrical surface 1102 as viewed by an eye 1101 of an observer, wherein concave cylindrical surface 1102 is arranged such that all parts of a vertical scanline 1103 (or line-of-sight of a user when the user views in directions 1104, i.e. up and down) have the same distance to eye 1101, and the horizontal scanline (or line-of-sight of a user) is a straight line In some implementations, a position of a surface may be expressed as one or more of distance from an individual distancing device, an angle from reference line (e.g., a horizontal line), a three-dimensional spatial coordinate in a coordinate system, and/or other information. For example, in a three-dimensional Cartesian coordinate system, a spatial coordinate may be expressed as individual values of one or more of an x-component, y-component, z-component, and/or other components.

In some implementations, position information may comprise point cloud information. Point cloud information may include positions of points in individual sets of points, referred to as "point clouds." In some implementations, individual points in a point cloud may have real-world spatial coordinates corresponding to individual positions of individual surfaces in the real-world. A set of points may correspond to positions of a set of surfaces within a range of vision of a distancing device. Individual points may be associated with individual time stamps. An individual time stamp may correspond to an individual point in time when an individual a position of an individual surface may have been measured (e.g., based on a sampling rate of the distancing device). It is noted that one or more references to "a surface" or "surfaces" may refer to "a point" or "points," respectively, within a point cloud that lie on the surfaces and convey position of the surfaces in the real-world. In some implementations, a set of surfaces and/or a set of points may form a contiguous surface. In some implementations, a set of surfaces and/or a set of points may make up a contiguous object.

In some implementations, system 100 may use a single distancing device 120, which may generate output signals originating from a single point-of-view. In such a case, part of a hand may occlude one or more fingers. As a result, the point cloud for such a hand may appear to include fewer than five digits. In some implementations, system 100 may use multiple distancing devices 120, e.g. having different points-of-view. By combining the output signals generated from multiple distancing devices 120, a richer point cloud containing more information may be derived. In some implementations, such types of point clouds may have less occlusion than single-device single-point-of-view point clouds.

The one or more physical processors 104 may be configured by machine-readable instructions 106. Executing machine-readable instructions 106 may cause one or more physical processors 104 to facilitate tracking a human hand in an interactive space. The machine-readable instructions 106 may include one or more of a control component 108, an input component 110, a hand candidate component 111, an edge component 112, a distance component 113, a center point component 114, a model component 115, a digit candidate component 116, a digit orientation component 117, a hand analysis component 118, and/or other components.

In some implementations, control component 108 may be configured to control one or more components of system 100. In some implementations, control component 108 may be configured to control individual distancing devices of one or more distancing devices 120, and/or other components. In some implementations, control of individual distancing devices of one or more distancing devices 120 may include control of one or more of a sampling rate at which individual distancing devices of one or more distancing devices 120 generate output signals, a sampling period in which individual distancing devices of one or more distancing devices 120 generate output signals, a resolution and/or granularity of one or more distancing devices 120, a horizontal and/or vertical width of the angle of capture and/or generation of one or more distancing devices 120, and/or other control of individual distancing devices of one or more distancing devices 120.

In some implementations, control component 108 may be configured to control individual light sources of one or more light sources 122, and/or other components. In some implementations, control of individual light sources of one or more light sources 122 may include one or more of control of light emission in accordance with one or more instances of virtual content to be generated and/or presented in an interactive space, and/or other types of control. By way of non-limiting illustration, control component 108 may be configured to control a first light source to generate a view of an instance of a first virtual object.

Input component 110 may be configured to obtain position information and/or other information. Position information may be derived from output signals of individual distancing devices of one or more distancing devices 120, from electronic storage 119, from remote storage, and/or from other sources. In some implementations, position information may be obtained at a sampling rate of individual distancing devices of one or more distancing devices 120. Point cloud information may include positions, depths, and/or distances of a set of points that lie on the surfaces of one or more real-world objects. For example, the positions may be on or near surfaces of real-world objects, including but not limited to a user's hands. In some implementations, point cloud information may be three-dimensional positional information.

Figure 2:
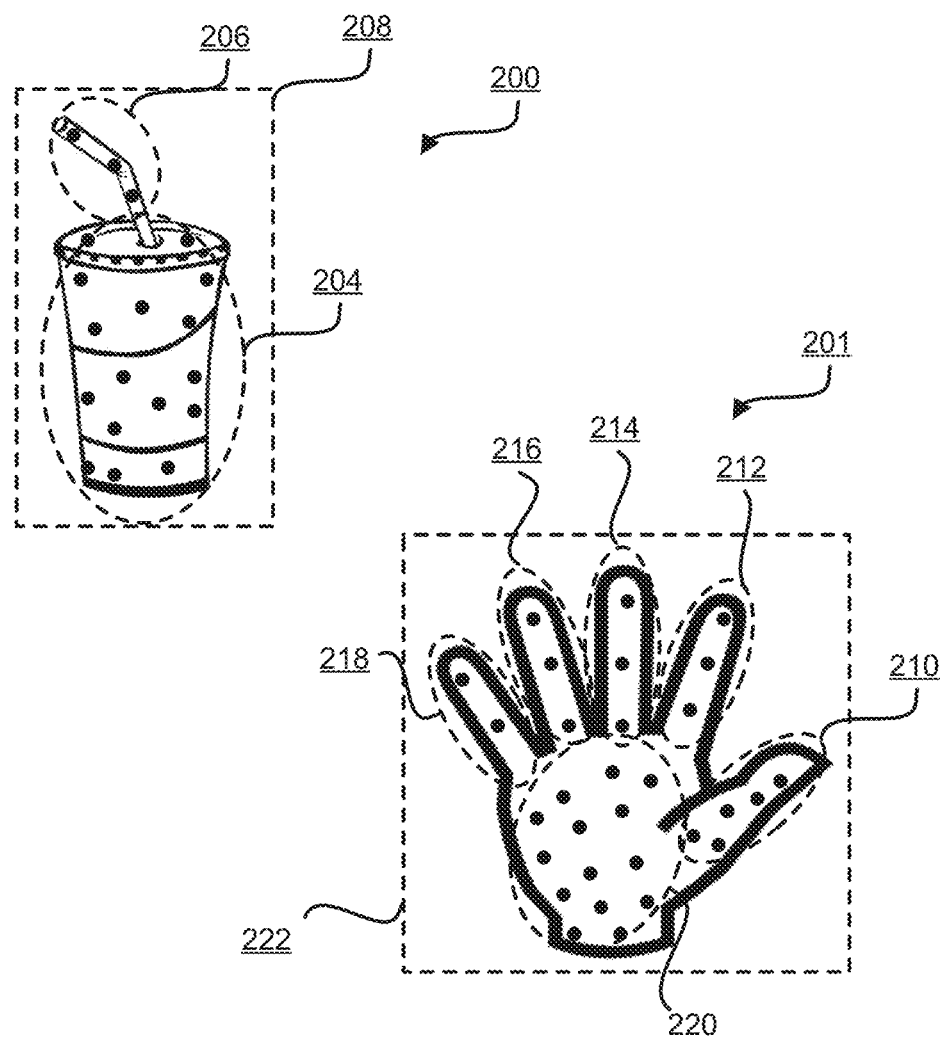
FIG. 2 is a graphic illustrating points on surfaces of real-world objects, the points representing three-dimensional positions of the surfaces of the real-world objects.

Referring to FIG. 2, a graphic is shown illustrating points on surfaces of real-world objects. FIG. 2 shows generally a first real-world object 200 and a second real-world object 201 that may be with a field-of-view of a distancing device. Also shown is graphical representation of output of the distancing device in the form of black dots representing surface position measurements on first object 200 and second object 201 from which position information may be derived. It is noted however that the black dots are shown for illustrative purposes, and in a real-world implementation may not be visible to a user. Further, it is noted that the quantity and/or arrangement of the black dots is for illustrative purposes and not intended to be limiting. For example, a distancing device may be configured to sample hundreds or thousands of surfaces in a uniform pattern and/or in other sampling patterns.

For non-limiting illustrative purposes, first object 200 may comprise a soda cup; and second object 201 may comprise a human hand. System 100 may be configured to obtain position information derived from sensor output (see, e.g., input component 110). System 100 may be configured to determine clusters of points and/or surfaces. The clusters may include one or more of a first cluster 204, a second cluster 206, a third cluster 210, a fourth cluster 212, a fifth cluster 214, a sixth cluster 216, a seventh cluster 218, an eighth cluster 220, and/or other clusters.

System 100 may be configured to determine groups of clusters based on proximity, similarity in size and/or shape, similarity to predetermined patterns and/or templates, similarity and/or range of colors, and/or based on other characteristics. Groups of clusters may include one or more clusters of points and/or surfaces that may make up individual contiguous objects. The groups of clusters may include one or more of a first cluster group 208, a second cluster group 222, and/or other groups of clusters. The first cluster group 208 may include one or more of first cluster 204, second cluster 206, and/or other clusters. The second cluster group 222 may include one or more of third cluster 210, fourth cluster 212, fifth cluster 214, sixth cluster 216, seventh cluster 218, eighth cluster 220, and/or other clusters.

System 100 may be configured to associate, for the individual groups of clusters, the individual clusters in the individual cluster groups with individual anatomical features, including but not limited to features of a hand. By way of non-limiting illustration, first cluster 204, eighth cluster 220, and/or other clusters may be associated with a first hand-feature (i.e. a feature related to a human hand); second cluster 206, fourth cluster 212, fifth cluster 214, sixth cluster 216, seventh cluster 218, and/or other clusters may be associated with a second hand-feature; and third cluster 210 may be associated with a third hand-feature. The first hand-feature may include a palm of a hand; the second hand-feature may include a finger of a hand; and the third hand-feature may include a thumb of a hand.

Referring to FIG. 1, in some implementations, hand candidate component 111 may be configured to identify a group of points that is a subset of the set of points such that the group of points lie on a candidate surface which is a candidate for being a surface of a hand. In some implementations, a group of points may be similar to a cluster of points, as described in relation to FIG. 2. For example, hand candidate component 111 may be configured to determine clusters and groups of clusters as described in relation to FIG. 2. For example, hand candidate component 111 may be configured to associate clusters and/or groups of clusters as described in relation to FIG. 2, with anatomical features.

In some implementations, identifying the group of points may be based on one or more of an estimated surface area of the group of points, an estimated volume of the group of points, a distance from the distancing device to the group of points, a range of distances from the distancing device to the group of points, and a range of ratios of the estimated surface area of the group of points and the estimated volume of the group of points. For example, a typical range of surface areas for a human hand in a particular pose (say, a fist, or a hand with all digits pointing outwards like a star, etc.) may be known in advance, e.g., as based on statistical analysis and/or measurements. Similarly, a typical volume of a hand (or of a bounding box around a hand, with the hand in a particular pose), may be known in advance. Additionally, for a distancing device 120 worn in a predetermined manner (e.g., as part of a HMD) by a user of known and/or estimated dimensions, the maximum distance of the user's hands to the distancing device 120 may be known and/or estimated in advance. For example, the system can be configured to determine that objects at 5 or more feet from the user's head are not the user's hands.

In some implementations, identifying the group of points is based on a range of (skin) colors of the group of points. In some implementations, distancing device 120 may be configured to generate the output signals at a first moment in time. For example, identifying the group of points may be based on a location compared to a previously identified group of points derived from output signals generated at a second moment in time, the second moment in time occurring prior to the first moment in time. For example, a user's hands may be expected to move at typical human speeds and are, e.g., unlikely to travel across the field-of-view of a distancing device or user in a manner that suggests that the locations of the same hand in subsequently captured and/or generated frames (at, say, a 30 frames-per-second rate) are many feet apart in the real world.

Edge component 112 may be configured to detect a set of surface edges of the candidate surface, wherein detection of the set of edges is based on depth information of individual points in the group of points. By way of non-limiting example, FIG. 3 illustrates a grid 30 of points for which depth information has been generated. By way of non-limiting example, the distance of points on a hand 31 may be around 30 inches or less from a user, whereas the distance of point on any surface behind hand 31 may be greater than the distance of any point on hand 31. Gradual changes in distance between neighboring points may indicate that a hand is pointing away from the distancing device. A sudden distance disparity (i.e., not gradual) between neighboring points may be used to detect the edges of hand 31.

Figure 4:
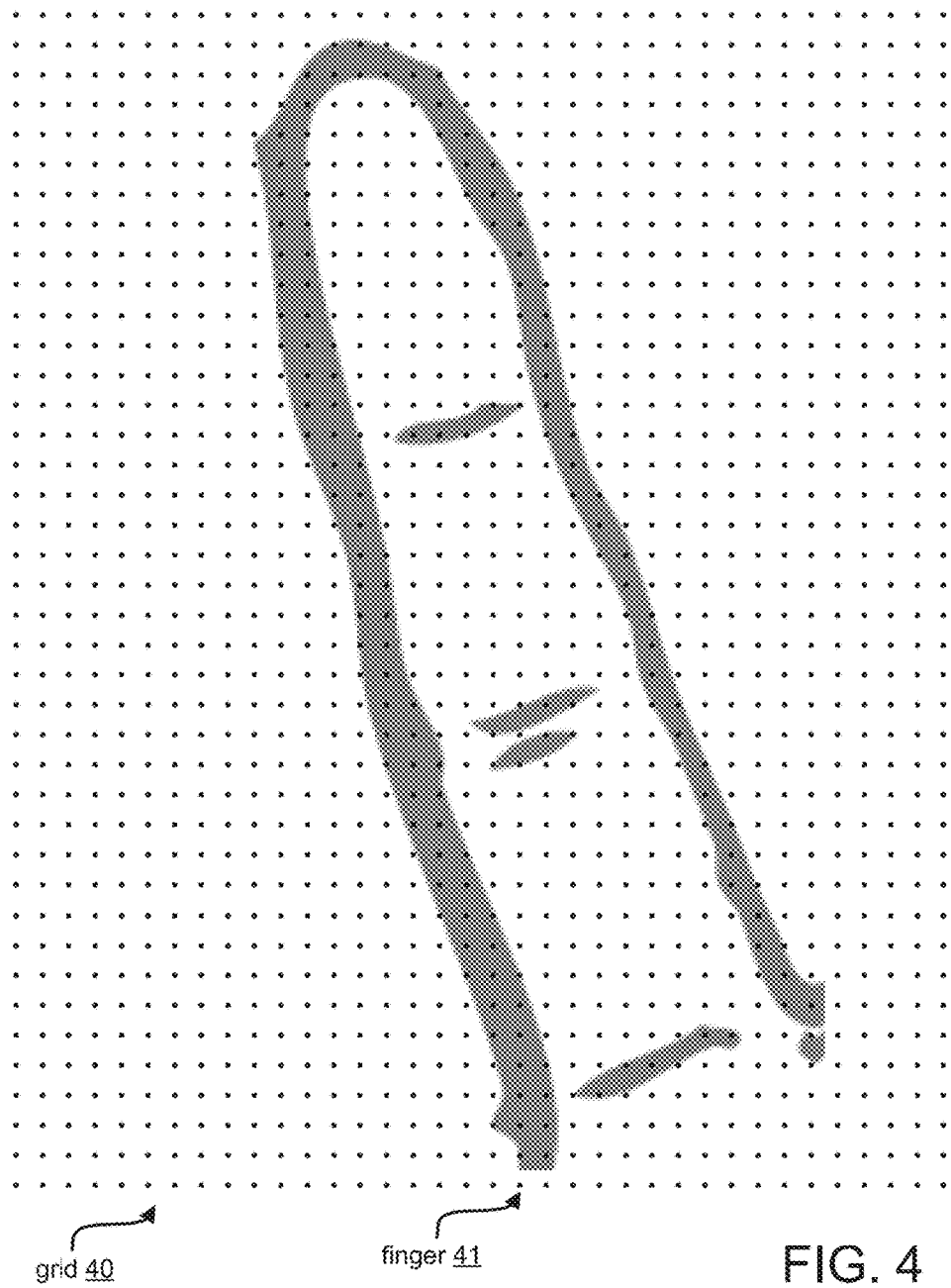
Figure 5:
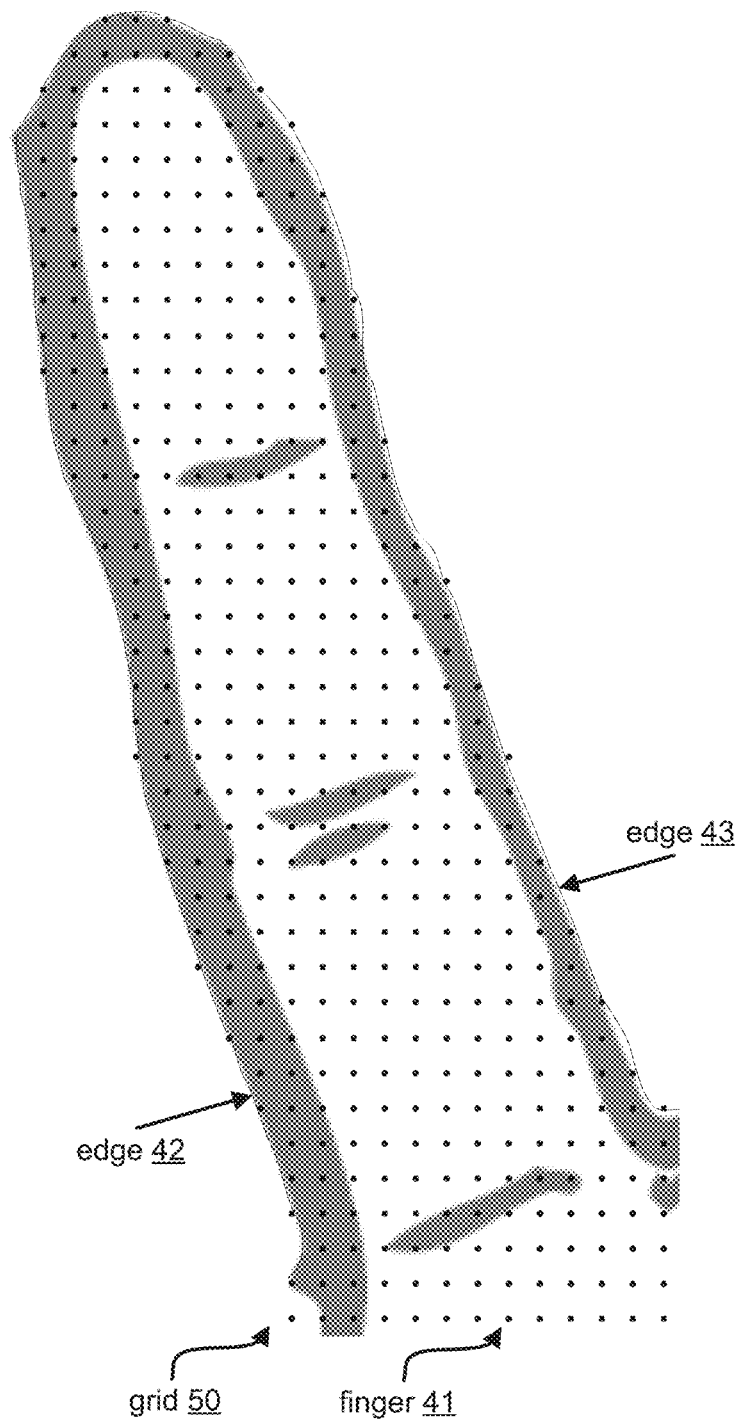

By way of non-limiting example, FIG. 4 illustrates a grid 40 of points for which depth information has been generated. Within grid 40 is a section of FIG. 3's hand 31, in particular a finger 41. Individual points of grid 40 have a distance as determined based on a distancing device. By way of non-limiting example, the distance of points on finger 41 may be around 30 inches or less from a user, whereas the distance of point on any surface behind finger 41 may be greater than the distance of any point on finger 41. Gradual changes in distance between neighboring points may indicate that a finger is pointing away from the distancing device. A sudden distance disparity (i.e., not gradual) between neighboring points may be used to detect the edges of finger 41. By way of non-limiting example, FIG. 5 illustrates a grid 50 of points for which depth information has been generated. As illustrated in FIG. 5, grid 50 includes a group of points selected from a larger grid (e.g., grid 40 of FIG. 4). The group of points selected in FIG. 5 lie on a candidate surface which is a candidate for being a surface of a hand, in particular the surface of finger 41. Grid 50 depicts the same finger 41 as shown in FIG. 4. An edge component such as edge component 112 may detect edges of finger 41 in FIG. 5, including but not limited to edge 42 and edge 43.

Referring to FIG. 1, distance component 113 may be configured to determine, for individual points in the group of points, which individual surface edges in the set of surface edges are closest to the individual points such that individual points are associated with closest individual surface edges.

Figure 6A:
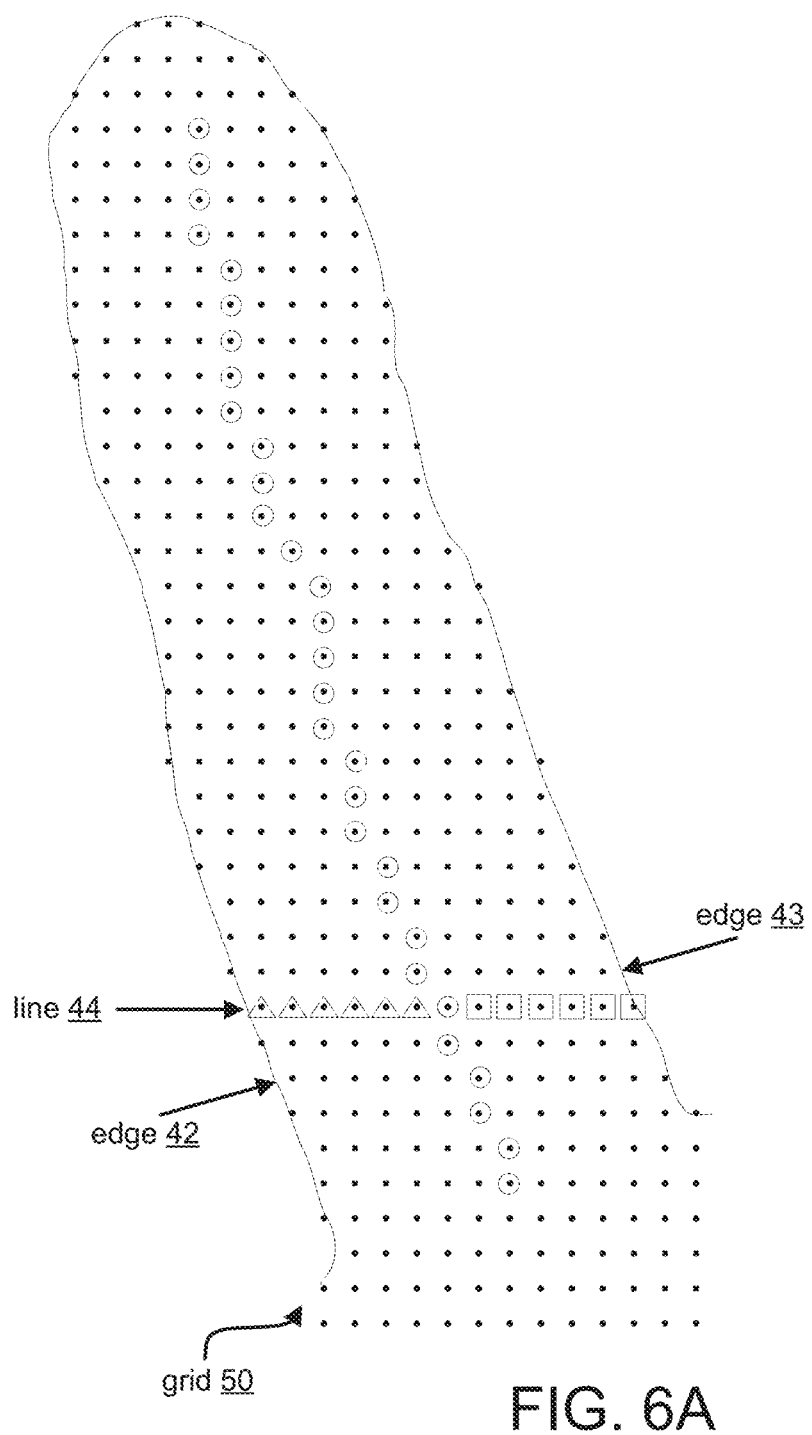

Distance component 113 may be configured to determine, for individual points in the group of points, distances to the associated closest individual surface edges. By way of non-limiting example, FIG. 6A illustrates a grid 50 (similar to the grid in FIG. 5) for which edges 42 and 43 have been detected. For a particular line 44 of points in grid 50, the points that are closer to edge 42 are indicated with a triangle, the points that are closer to edge 43 are indicated with a rectangle, and the individual point of line 44 that is the furthest from either edge (compared to all the points in line 44) is indicated with a circle.

Referring to FIG. 1, center point component 114 may be configured to determine a subset of points that is a subset of the group of points based on one or more relations between individual points in the group of points and one or more surface edges from a set of surface edges, e.g. the set of surface edges as determined by edge component 112. In some implementations, center point component 114 may be configured to determine a subset of points that is a subset of the group of such that individual points in the subset of points have equal or greater distances to the associated closest individual surface edges than neighboring points in the group of points. For example, for neighboring points on the same line, FIG. 6A illustrates the determination of a point having a greater distance from any edge in grid 50 in line 44. In some implementations, center point component 114 may be configured to determine points not per line, but by examining neighboring points to the right, left, above, and below individual points. In some implementations, center point component 114 may operate on groups of points without considering depth information, as if the surface formed by a particular group of points is flat and/or two-dimensional. Such an approximation of the actual distance between an individual point and its closest edge may be sufficiently accurate for the operation of center point component 114, even if not perfectly precise.

Figure 6B:
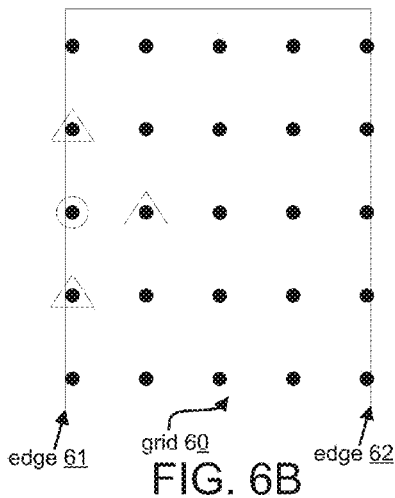
Figure 6C:
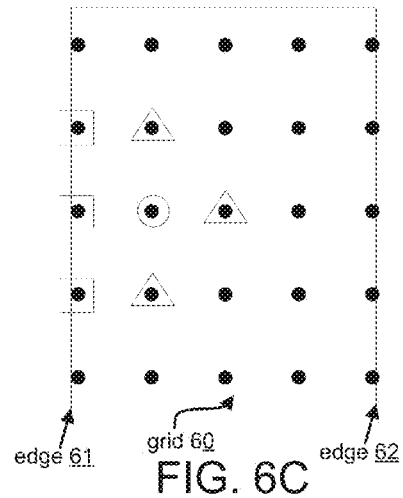
Figure 6D:
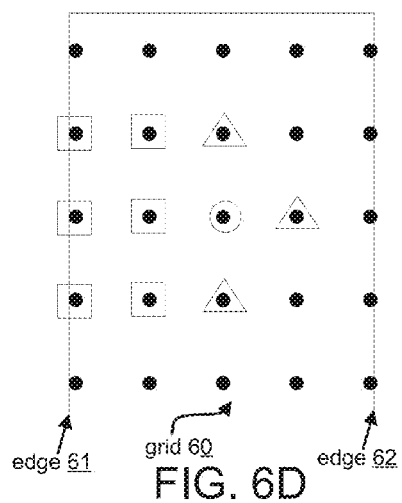
Figure 6E:
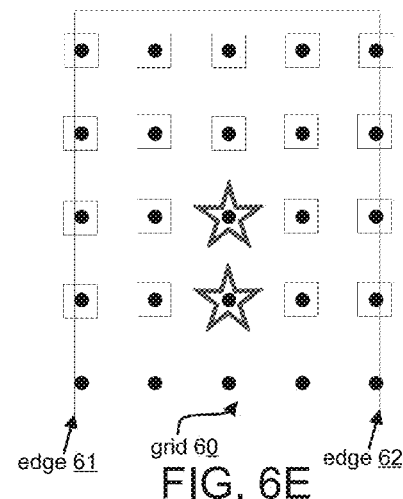

In some implementations, determining the subset of points is performed such that the neighboring points of an individual point include one or more of a first point to the left of the individual point, a second point to the right of the individual point, a third point above the individual point, and a fourth point below the individual point, as viewed from a point of view originating at the distancing device. By way of non-limiting example, FIG. 6B illustrates a grid 60 for which edges 61 and 62 have been detected. The circled point is a candidate point for being furthest from any edge. In the next step of this algorithm, neighboring points are analyzed (here, the neighboring points are indicated with triangles). Since the right-most point is further from any edge than the three points on edge 61, the next step of the algorithm uses this right-most point as the candidate point, as shown in FIG. 6C, where the former right-most point is circled, and new neighboring points have triangles. The points that have been discarded as candidate points are indicated by rectangles. In FIG. 6C, again the right-most point is further from any edge than either the current candidate point or the two points having triangles. Accordingly, this right-most point will be the circled candidate point in the next step as illustrated in FIG. 6D. New neighboring points of the candidate point have triangles, and discarded candidate points have rectangles. This process continues step by step until all points in grid 60 have been analyzed and either been discarded or deemed further from any edge than surrounding points. FIG. 6E illustrates grid 60 in which the top 20 points have been analyzed, and all but 2 points have been discarded (the remaining two points are indicated by stars).

Figure 7:
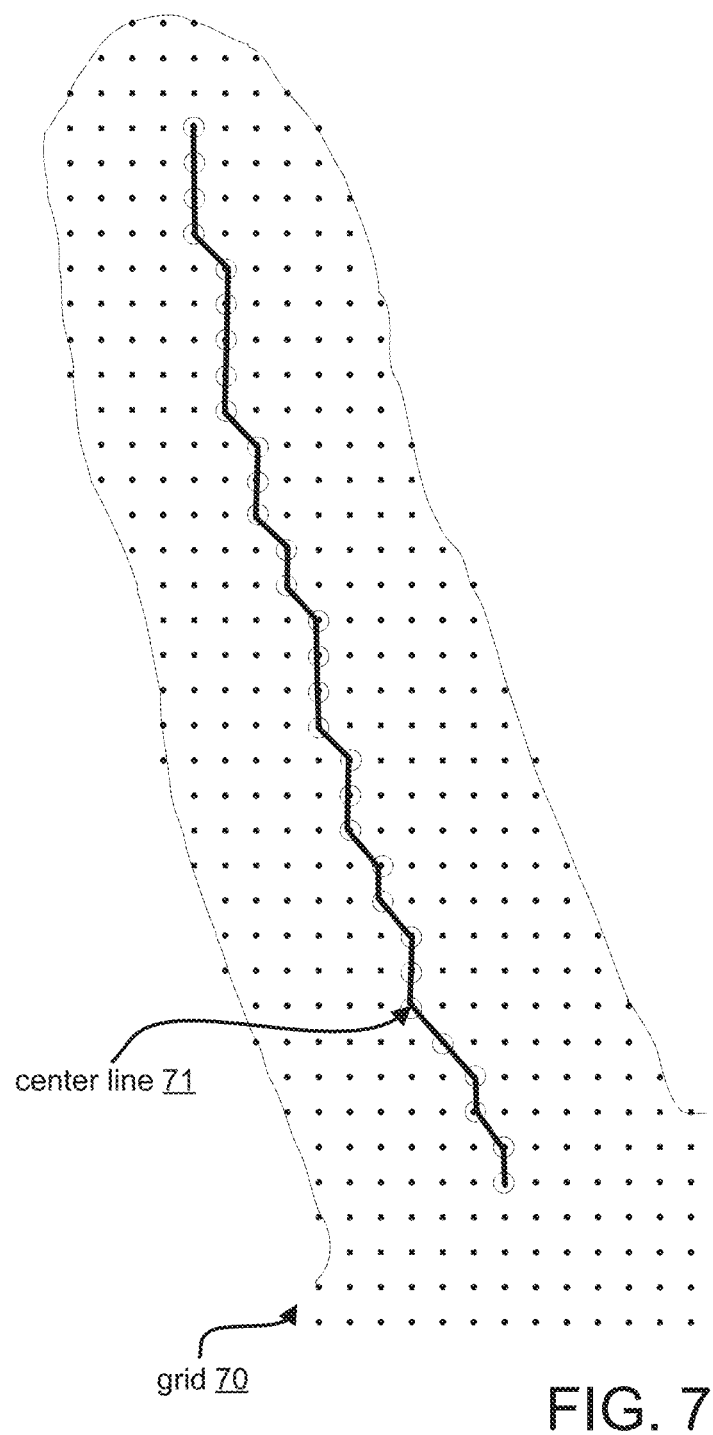

Referring to FIG. 1, model component 115 may be configured to create a model that connects neighboring points in the determined subset of points. In some implementations, the model may be extended by adding different subsets of points and/or anatomical parts of a hand together, such as different digits, a palm, and/or other hand features. By way of non-limiting example, FIG. 7 illustrates a grid 70 for which edges have been detected, similar to FIG. 6A. A subset of points has been determined (indicated by circles) that is a subset of the group of points such that individual points in the subset of points have equal or greater distances to the associated closest individual surface edges than neighboring points in the group of points. A center line 71 connects neighboring points in the subset of points (i.e., neighboring points in the set of circled points). A model as created based on grid 70 may include a center line such as center line 71. In some implementations, model component 115 may be configured to simplify the model, e.g., by reducing the number of points used to define a center line. For example, a center line may be defined by using 2, 3, 4 or more points. A center line defined by two points could only, potentially, closely match the position of a straight finger. By using 1 or 2 additional points located where the user's interphalangeal joints might be, a center line could, potentially, match different real-world finger positions of a user.

Figure 8A:
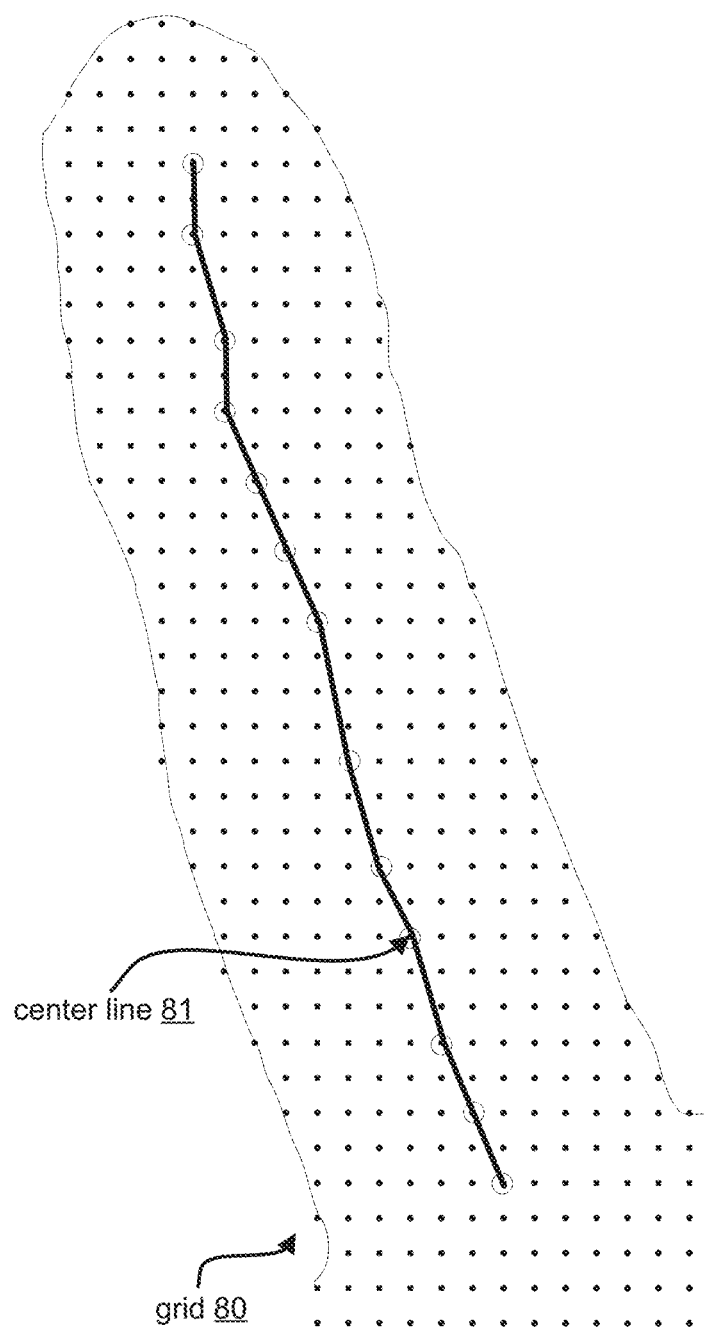

By way of non-limiting example, FIG. 8A illustrates a grid 80 and a center line 81 that may have been derived from grid 70 and center line 71 in FIG. 7. In some implementations, center point component 114 may be configured to determine a more stringently defined subset of points that is a subset of the group of points such that individual points in the subset of points have greater distances (e.g. greater by at least a predefined threshold level of distance) to the associated closest individual surface edges than neighboring points in the group of points. By using different definitions of "greater distance," different magnitudes of a threshold, and/or by requiring a bigger difference in distance with neighboring points for inclusion in the subset, the determined subset of points may have fewer points than one per line (as was shown in FIG. 6A). For example, center line 81 in FIG. 8A has fewer points than center line 71 in FIG. 7.

Figure 8B:
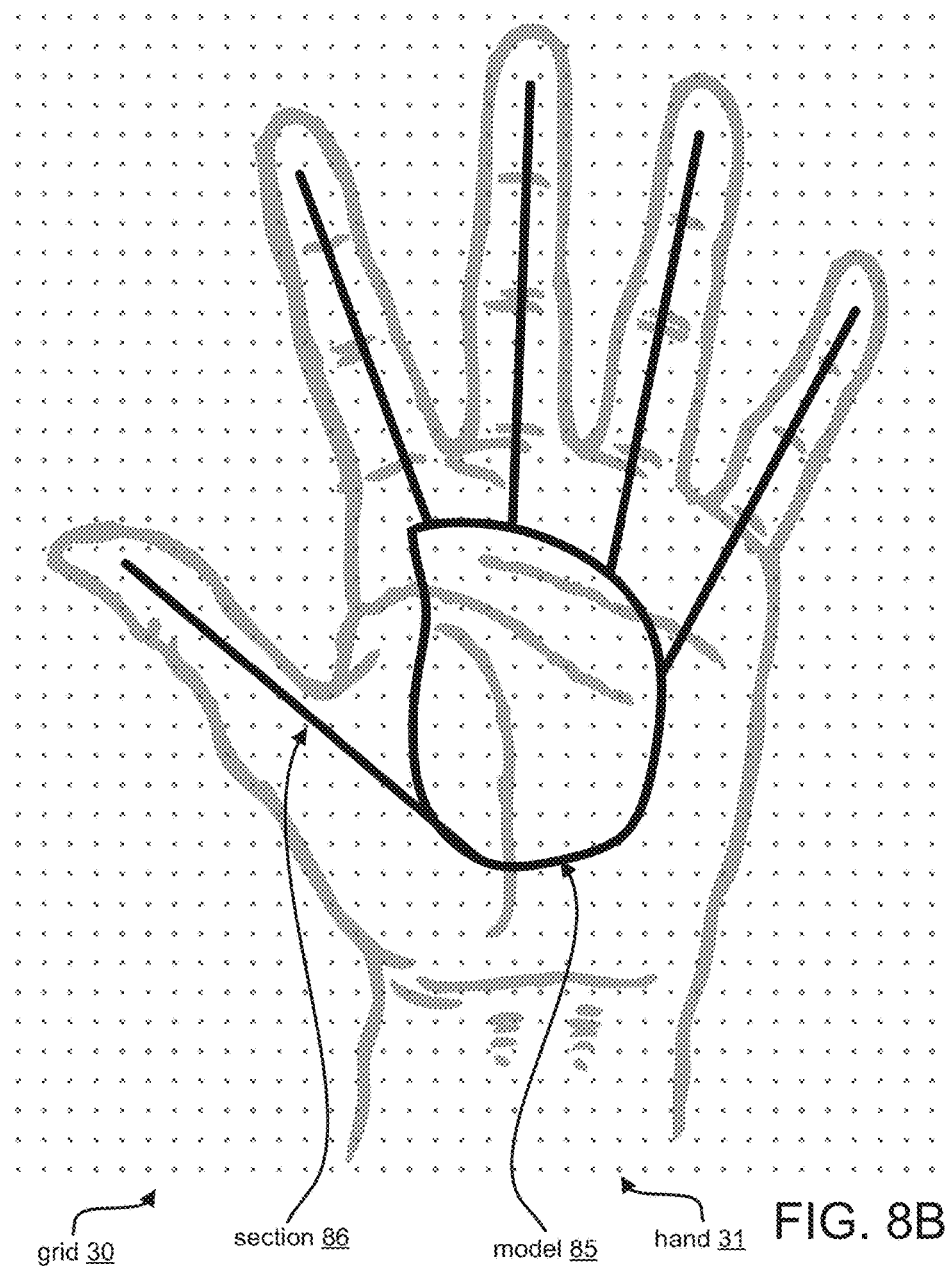

Digit candidate component 116 may be configured to identify one or more sections of the model created by model component 115 such that an individual section is a candidate section which is a candidate for being a finger or thumb of the hand. In some implementations, identifications by digit candidate component 116 may be based on the size of a section, on the shape of a section, on the distance between ends of the section, and/or on other characteristics. By way of non-limiting example, FIG. 8B illustrates a grid 30 and a hand 31 similar to those in FIG. 3, and a model 85 that may have been created from grid 30. Model 85 may include different center lines derived for different digits. In some implementations, individual center lines may correspond to different sections of the model, which may be identified by digit candidate component 116. For example, model 85 may include a section 86 that may have been identified as a candidate for a digit of hand 31.

In some implementations, a model created by model component 115 includes one or more sections that are candidates for being a digit of a hand, without including a section for the palm of the hand, the back of the hand, and/or other parts of the hand connecting different digits. In other words, in some implementations, a model created by model component 115 may include only those sections which are candidates for being a digit of a hand.

Referring to FIG. 1, digit orientation component 117 may be configured to identify tips and/or connective joints (including but not limited to metacarpophalangeal joints) for individual candidate sections. In some implementations, digit orientation component 117 may be configured to identify tips and/or connective joints from the one or more candidate sections such that an individual tip is a candidate tip which is a candidate for being a fingertip of an individual finger or thumb and/or an individual connective joint is a candidate connective joint which is a candidate for being a connective joint that connects the individual finger or thumb to the hand. As used herein, an identified connective joint is merely a point on the surface of a hand or a candidate surface of a hand, and not the actual metacarpophalangeal joint of the user. However, even the identification of a point on the surface of a user's hand that is near the actual location of the metacarpophalangeal joint of the user is sufficiently accurate for the purpose of identifying and tracking a human hand in an interactive space.

In some implementations, digit orientation component 117 may be configured to perform an individual identification based on a single (candidate) digit. In some implementations, digit orientation component 117 may be configured to perform an individual identification on relative characteristics (e.g., position, direction, size, shape, etc.) of multiple (candidate) digits. For example, based on knowledge of human anatomy, the left-most end of section 86 in FIG. 8B may be identified as a tip and the right-most end as a connective joint merely due to the positions and/or directions of the other digits of hand 31. For example, distances between metacarpophalangeal joints of the fingers of a hand are known to typically range between a predetermined minimum distance and a predetermined maximum distance (these numbers would cover the hands of, say, 99% of people). Additionally, distances between metacarpophalangeal joints of the fingers of the same hand (of the same user) are known to vary in a small range and/or be the same or similar. In some implementations, distances between the metacarpophalangeal joints of the fingers of a hand and the metacarpophalangeal joint of a thumb are known to vary in a small range. For example, the common distance from an index to a thumb may be 8 cm, with a 3 cm error tolerance. In some implementations, a user's hand's may be measured prior to system usage to calibrate system 100.

In some implementations, hand analysis component 118 may be configured to determine whether the candidate surface is the surface of the hand based on an analysis of the identified tips and connective joints. Hand analysis component 118 may be configured to analyze the identified tips and connective joints is based on determined distances between the identified tips and/or between the identified connective joints.

In some implementations, the analysis of the identified tips and connective joints includes grouping up to five candidate sections together as part of the same hand.

In some implementations, digit orientation component 117 may be configured to determine one or more two-dimensional and/or three-dimensional directional vectors for individual digits (or candidate sections). For example, a directional vector may be based on the fingertip and the connective joint of a digit. In some implementations, a directional vector may be based on the connective joint and the estimated location of either the proximal interphalangeal joint (for a finger) or the interphalangeal joint of a thumb. In some implementations, hand analysis component 118 may be configured such that the analysis of the identified tips and connective joints is based on comparisons of directional vectors as determined by digit orientation component 117. Based on known ranges of motion for human hands, and known possible relative positions of the digits of a hand, hand analysis component 118 may determine whether the candidate digits are plausibly connected to the same hand.

In some implementations, comparisons by hand analysis component 118 may be based on dot products of pairs of the determined directional vectors, in particular for neighboring fingers. For example, a dot product of greater than 0.6, 0.7, 0.8, or another threshold may indicate that a pair of candidate digits appear to roughly point in the same direction. For example, a dot product of less than 0.5, 0.4, 0.3, or another threshold may indicate that a pair of candidate digits appear to roughly point in opposite directions, potentially in a manner that could be considered as anatomically unlikely or otherwise unusual.

In some implementations, known shapes, forms, sizes and/or other features of a human hand may be determined on a per-user-basis. For example, individual users may be prompted to position one or more hands within a field-of-view of a distancing device so that the distancing device may sample surfaces of the individual user's own hands. The position information derived from sensor output measuring the individual user's own hands may be used to determined one or more of an over shape, form, sizes, dimensions, and/or other features of the individual user's own hands. In some implementations, the user may be prompted to position their hands in various orientations (e.g., palm up, palm down, palm to the side, fingers in a grip, fingers released, etc.). Dimensions may include one or more of individual lengths of individual fingers, individual lengths of individual thumbs, a width of the hand at the knuckles, a width of the hand at the palm, a surface area of the palm, and/or other dimensions. The features of the individual user's own hands and/or averages (e.g., averaged over different orientations) may be used as one or more canonical hand models that one or more of identifications of a hand (including, for example, whether it may be a right hand or left hand), identifications of individual hand features, and/or determination of feature positions of individual hand features may be based on.

In some implementations, determining individual positions of individual hand features of a human hand may be based on anatomical relationships between hand features of a human hand, one or more canonical hand models, and/or other information. Anatomical relationships may comprise one or more of a directional relationship between hand features, a distance relationship between hand features, an orientation relationship between hand features, and/or other relationships. Anatomical relationships between hand features may follow one or more known conventions such that determining a feature position of one hand feature from a feature position of one or more other hand features may be possible.

By way of non-limiting illustration, given a feature position of a first hand-feature of a hand, a feature position of a second hand-feature of the hand may be determined based on one or more of a range of distances from the feature position of the first hand-feature that may be anatomically possible to correspond to the feature position of the second hand-feature, one or more directions from the feature position of the first hand-feature that may be anatomically possible to point to the feature position of the second hand-feature, and/or other information. By way of non-limiting illustration, given a feature position of a wrist of a hand, a feature position of a thumb of the hand may be determined based on one or more of range of distances from the wrist position that may be anatomically possible to correspond to the feature position of the thumb, one or more directions from the feature position of the wrist that may be anatomically possible to point to the feature position of the thumb, and/or other information.

In some implementations, determining a feature position of a first hand-feature may include an initial determination of an estimated feature position of the first hand feature. An estimated feature position of the first hand-feature may be initially determined from position information derived from sensor output that conveys positions of surfaces of a hand.

Returning to FIG. 1, processor(s) 104, one or more distancing device 120, one or more light sources 122, one or more optical elements 124, external resources 126, and/or other components of system 100 may be operatively linked via one or more electronic communication links. For example, such electronic communication links may be established, at least in part, via network(s) 121. Network(s) 121 may comprise one or both of wired and/or wireless communications. It will be appreciated that this is not intended to be limiting and that the scope of this disclosure includes implementations in which processor(s) 104, one or more distancing device 120, one or more light sources 122, one or more optical elements 124, external resources 126, and/or other components of system 100 may be operatively linked via some other communication media.

The external resources 126 may include sources of information, hosts, external entities participating with system 100, providers of virtual content, and/or other resources. In some implementations, some or all of the functionality attributed herein to external resources 126 may be provided by resources included in system 100.

Processor(s) 104 may include and/or have access to electronic storage 119, and/or other components. Processor(s) 104 may include communication lines or ports to enable the exchange of information with a network, electronic storage 119, and/or other components of system 100. Illustration of processor(s) 104 in FIG. 1 is not intended to be limiting. Processor(s) 104 may include a plurality of hardware, software, and/or firmware components operating together to provide the functionality attributed herein to processor(s) 104. For example, processor(s) 104 may be implemented by a cloud of computing platforms operating together as processor(s) 104.

Electronic storage 119 may comprise electronic storage media that electronically stores information. The electronic storage media of electronic storage 119 may include one or both of system storage that is provided integrally (i.e., substantially non-removable) with processor(s) 104 and/or removable storage that is removably connectable to processor(s) 104 via, for example, a port or a drive. A port may include a USB port, a firewire port, and/or other port. A drive may include a disk drive and/or other drive. Electronic storage 119 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 119 may include one or more virtual storage resources (e.g., cloud storage, a virtual private network, and/or other virtual storage resources). Electronic storage 119 may store software algorithms, information determined by processor(s) 104, information received from other components of system 100, and/or other information that enables processor(s) 104 to function as described herein.

Processor(s) 104 is configured to provide information-processing capabilities. As such, processor(s) 104 may include one or more of a digital processor, an analog processor, a digital circuit designed to process information, an analog circuit designed to process information, a state machine, and/or other mechanisms for electronically processing information. Although processor(s) 104 is shown in FIG. 1 as a single entity, this is for illustrative purposes only. In some implementations, processor(s) 104 may include one or more processing units. These processing units may be physically located within the same device, or processor(s) 104 may represent processing functionality of a plurality of devices operating in coordination. Processor(s) 104 may be configured to execute components 108, 110-118. Processor(s) 104 may be configured to execute components 108, 110-118 by software; hardware; firmware; some combination of software, hardware, and/or firmware; and/or other mechanisms for configuring processing capabilities on processor(s) 104.

It should be appreciated that although components 108, 110-118 are illustrated in FIG. 1 as being co-located within a single processing unit, in implementations in which processor(s) 104 includes multiple processing units, one or more of components 108, 110-118 may be located remotely from the other components. The description of the functionality provided by the different components 108, 110-118 described above is for illustrative purposes and is not intended to be limiting, as any of components 108, 110-118 may provide more or less functionality than is described. For example, one or more of components 108, 110-118 may be eliminated, and some or all of its functionality may be provided by other ones of components 108, 110-118, and/or other components. As another example, processor(s) 104 may be configured to execute one or more additional components that may perform some or all of the functionality attributed to one of components 108, 110-118.

Figure 9:
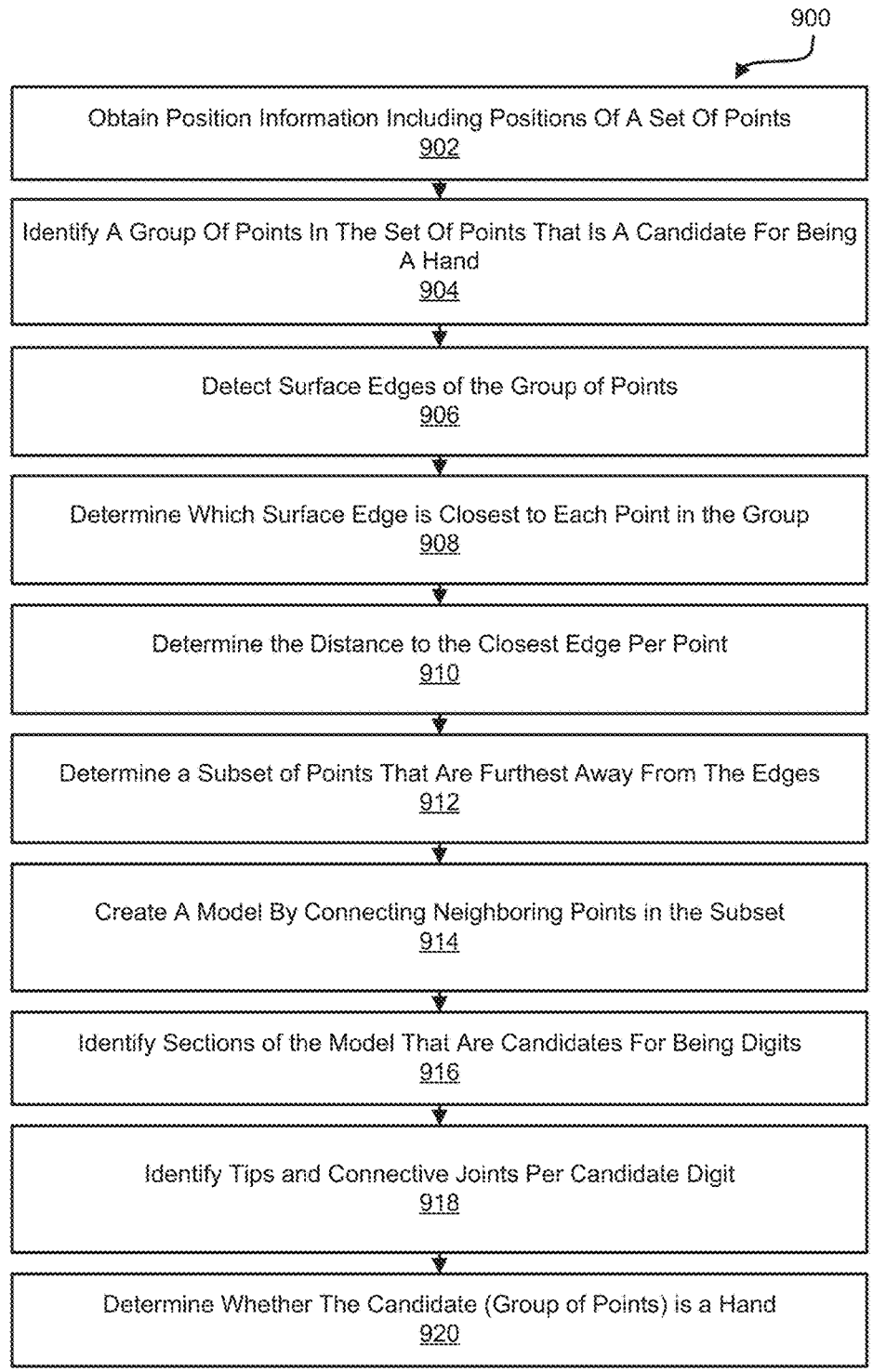
FIG. 9 illustrates a method of identifying and tracking a human hand, e.g., in an interactive space, in accordance with one or more implementations.

FIG. 9 illustrates a method 900 of identifying and tracking a human hand, e.g., in an interactive space, in accordance with one or more implementations. The operations of method 900 presented below are intended to be illustrative. In some implementations, method 900 may be accomplished with one or more additional operations not described, and/or without one or more of the operations discussed. A method of identifying and tracking a human hand may include fewer steps than described in relation to FIG. 9, or depicted in FIG. 9. Additionally, the order in which the operations of method 900 are illustrated in FIG. 9 and described below is not intended to be limiting.

In some implementations, method 900 may be implemented in a computer system comprising one or more of non-transitory electronic storage storing machine-readable instructions, one or more processing devices (e.g., a physical processor, a digital processor, an analog processor, a digital circuit designed to process information, an analog circuit designed to process information, a state machine, and/or other mechanisms for electronically processing information), one or more light sources, one or more distancing devices, one or more optical elements, and/or other components. The one or more processing devices may include one or more devices executing some or all of the operations of method 900 in response to instructions stored electronically on electronic storage media. The one or more processing devices may include one or more devices configured through hardware, firmware, and/or software to be specifically designed for execution of one or more of the operations of method 900.

At an operation 902, position information may be obtained. The position information may be derived from output signals of a distancing device. The position information may include positions of surfaces of real-world objects. The position information may comprise point cloud information. The point cloud information may include positions of a set of points that lie on the surfaces of the real-world objects, such that the positions are on or near the surfaces of the real-world objects. In some embodiments, operation 902 is performed by an input component the same as or similar to input component 110 (shown in FIG. 1 and described herein).

At an operation 904, a group of points is identified that is a subset of the set of points such that the group of points lie on a candidate surface which is a candidate for being a surface of a hand. In some embodiments, operation 904 is performed by a hand candidate component the same as or similar to hand candidate component 111 (shown in FIG. 1 and described herein).

At an operation 906, a set of surface edges of the candidate surface is detected. Detection of the set of edges is based on depth information of individual points in the group of points. In some embodiments, operation 906 is performed by an edge component the same as or similar to edge component 112 (shown in FIG. 1 and described herein).

At an operation 908, it is determined, for individual points in the group of points, which individual surface edges in the set of surface edges are closest to the individual points such that individual points are associated with closest individual surface edges. In some embodiments, operation 908 is performed by a distance component the same as or similar to distance component 113 (shown in FIG. 1 and described herein).

At an operation 910, it is determined, for individual points in the group of points, distances to the associated closest individual surface edges. In some embodiments, operation 910 is performed by a distance component the same as or similar to distance component 113 (shown in FIG. 1 and described herein).

At an operation 912, a subset of points is determined that is a subset of the group of points, wherein the determination is based on a relation between individual points in the group of points and one or more surface edges from the set of surface edges. In some implementations, a subset of points is determined that is a subset of the group of points such that individual points in the subset of points have equal or greater distances to the associated closest individual surface edges than neighboring points in the group of points. In some embodiments, operation 912 is performed by a center point component the same as or similar to center point component 114 (shown in FIG. 1 and described herein).

At an operation 914, a model is created that connects neighboring points in the determined subset of points. In some embodiments, operation 914 is performed by a model component the same as or similar to model component 115 (shown in FIG. 1 and described herein).

At an operation 916, one or more sections of the model are identified such that an individual section is a candidate section which is a candidate for being a finger or thumb of the hand. In some embodiments, operation 916 is performed by a digit candidate component the same as or similar to digit candidate component 116 (shown in FIG. 1 and described herein).

At an operation 918, tips and connective joints are identified for individual candidate sections from the one or more candidate sections such that an individual tip is a candidate tip which is a candidate for being a fingertip of an individual finger or thumb and an individual connective joint is a candidate connective joint which is a candidate for being a connective joint that connects the individual finger or thumb to the hand. In some embodiments, operation 918 is performed by a digit orientation component the same as or similar to digit orientation component 117 (shown in FIG. 1 and described herein).

At an operation 920, it is determined whether the candidate surface is the surface of the hand based on an analysis of the identified tips and connective joints. In some embodiments, operation 920 is performed by a hand analysis component the same as or similar to hand analysis component 118 (shown in FIG. 1 and described herein).

Although the disclosed technology has been described in detail for the purpose of illustration based on what is currently considered to be the most practical and preferred implementations, it is to be understood that such detail is solely for that purpose and that the disclosure is not limited to any particular implementations, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A system configured for identifying and tracking a human hand, the system comprising:
   a distancing device configured to generate output signals conveying position information, the position information including positions of surfaces of real-world objects, wherein the position information comprises point cloud information, the point cloud information including positions of a set of points that lie on the surfaces of the real-world objects, such that the positions are on or near the surfaces of the real-world objects; and
   one or more physical processors configured by machine-readable instructions to:
      obtain the position information derived from the output signals of the distancing device;
      identify a group of points that is a subset of the set of points such that the group of points lie on a candidate surface which is a candidate for being a surface of a hand;
      detect a set of surface edges of the candidate surface, wherein detection of the set of edges is based on depth information of individual points in the group of points;
      determine a subset of points that is a subset of the group of points, wherein the determination is based on a relation between individual points in the group of points and one or more surface edges from the set of surface edges;
      create a model that connects neighboring points in the determined subset of points;
      identify one or more sections of the model such that an individual section is a candidate section which is a candidate for being a finger or thumb of the hand;
      identify tips and connective joints for individual candidate sections from the one or more candidate sections such that an individual tip is a candidate tip which is a candidate for being a fingertip of an individual finger or thumb and an individual connective joint is a candidate connective joint which is a candidate for being a connective joint that connects the individual finger or thumb to the hand; and determine whether the candidate surface is the surface of the hand based on an analysis of the identified tips and connective joints.

2. The system of claim 1, wherein the one or more physical processors are further configured to:

determine, for individual points in the group of points, which individual surface edges in the set of surface edges are closest to the individual points such that individual points are associated with closest individual surface edges; and determine, for individual points in the group of points, distances to the associated closest individual surface edges;

wherein determination of the subset of points is performed such that individual points in the subset of points have equal or greater distances to the associated closest individual surface edges than neighboring points in the group of points.

3. The system of claim 2, wherein determining the subset of points is performed such that the neighboring points of an individual point include one or more of a first point to the left of the individual point, a second point to the right of the individual point, a third point above the individual point, and a fourth point below the individual point, as viewed from a point of view originating at the distancing device.

4. The system of claim 1, wherein the one or more physical processors are further configured to:

determine one or more distances between the identified tips and/or between the identified connective joints;

wherein the analysis of the identified tips and connective joints is based on the determined one or more distances.

5. The system of claim 1, wherein the one or more physical processors are further configured to:

determine directional vectors for the individual candidate sections, wherein the analysis of the identified tips and connective joints is based on comparisons of the determined directional vectors.

6. The system of claim 5, wherein the comparisons are based on dot products of pairs of the determined directional vectors.

7. The system of claim 1, wherein the distancing device is configured to generate the output signals such that the position information is organized in a regular grid.

8. The system of claim 1, wherein identifying the group of points is based on one or more of an estimated surface area of the group of points, an estimated volume of the group of points, a distance from the distancing device to the group of points, a range of distances from the distancing device to the group of points, and a range of ratios of the estimated surface area of the group of points and the estimated volume of the group of points.

9. The system of claim 1, wherein identifying the group of points is based on a range of colors of the group of points.

10. The system of claim 1, wherein the distancing device is configured to generate the output signals at a first moment in time, and wherein identifying the group of points is based on a location compared to a previously identified group of points derived from output signals generated at a second moment in time, wherein the second moment in time occurred prior to the first moment in time.

11. The system of claim 1, wherein the analysis of the identified tips and connective joints includes grouping up to five candidate sections together as part of the same hand.

12. The system of claim 1, further comprising:

a light source configured to emit light; and an optical element the optical element being configured to reflect light emitted from the light source in a perceived three-dimensional light field within a field-of-view of a user of the interactive space.

13. The system of claim 12, wherein the one or more physical processors are further configured by machine-readable instructions to:

generate views of virtual content to be perceived within the field-of-view of the user; and facilitate user interaction with the virtual content based on one or more of a position of the hand, a gesture of the hand, and a movement of the hand.

14. The system of claim 13, wherein the virtual content includes one or more virtual objects.

15. The system of claim 1, wherein position information is obtained based on a sampling rate of the distancing device.

16. A method of identifying and tracking a human hand, the method being implemented in a computer system comprising one or more physical processors and non-transitory storage media storing machine-readable instructions, the method comprising:

obtaining position information, the position information being derived from output signals of a distancing device, the position information including positions of surfaces of real-world objects, wherein the position information comprises point cloud information, the point cloud information including positions of a set of points that lie on the surfaces of the real-world objects, such that the positions are on or near the surfaces of the real-world objects;

identifying a group of points that is a subset of the set of points such that the group of points lie on a candidate surface which is a candidate for being a surface of a hand;

detecting a set of surface edges of the candidate surface, wherein detection of the set of edges is based on depth information of individual points in the group of points;

determining a subset of points that is a subset of the group of points, wherein the determination is based on a relation between individual points in the group of points and one or more surface edges from the set of surface edges;

creating a model that connects neighboring points in the determined subset of points;

identifying one or more sections of the model such that an individual section is a candidate section which is a candidate for being a finger or thumb of the hand;

identifying tips and connective joints for individual candidate sections from the one or more candidate sections such that an individual tip is a candidate tip which is a candidate for being a fingertip of an individual finger or thumb and an individual connective joint is a candidate connective joint which is a candidate for being a connective joint that connects the individual finger or thumb to the hand; and determining whether the candidate surface is the surface of the hand based on an analysis of the identified tips and connective joints.

17. The method of claim 16, further comprising:

determining, for individual points in the group of points, which individual surface edges in the set of surface edges are closest to the individual points such that individual points are associated with closest individual surface edges; and determining, for individual points in the group of points, distances to the associated closest individual surface edges, wherein determination of the subset of points is performed such that individual points in the subset of points have equal or greater distances to the associated closest individual surface edges than neighboring points in the group of points.

18. The method of claim 17, further comprising:
determining directional vectors for the individual candidate sections, wherein the analysis of the identified tips and connective joints is based on comparisons of the determined directional vectors.

19. The method of claim 18, wherein the comparisons are based on dot products of pairs of the determined directional vectors.

20. The method of claim 17, wherein the distancing device generates the output signals such that the position information is organized in a regular grid.

21. The method of claim 17, wherein identifying the group of points is based on one or more of an estimated surface area of the group of points, an estimated volume of the group of points, a distance from the distancing device to the group of points, a range of distances from the distancing device to the group of points, and a range of ratios of the estimated surface area of the group of points and the estimated volume of the group of points.

22. The method of claim 17, wherein identifying the group of points is based on a range of colors of the group of points.

23. The method of claim 17, wherein the distancing device generates the output signals at a first moment in time, and wherein identifying the group of points is based on a location compared to a previously identified group of points derived from output signals generated at a second moment in time, wherein the second moment in time occurred prior to the first moment in time.

24. The method of claim 17, wherein the analysis of the identified tips and connective joints includes grouping up to five candidate sections together as part of the same hand.

25. The method of claim 17, further comprising:
emitting light, by a light source; and
reflecting light emitted by the light source in a perceived three-dimensional light field within a field-of-view of a user of the interactive space.

26. The method of claim 25, further comprising:
generating views of virtual content to be perceived within the field-of-view of the user; and
facilitating user interaction with the virtual content based on one or more of a position of the hand, a gesture of the hand, and a movement of the hand.

27. The method of claim 26, wherein the virtual content includes one or more virtual objects.

28. The method of claim 17, wherein position information is obtained based on a sampling rate of the distancing device.

29. The method of claim 16, further comprising:
determining one or more distances between the identified tips and/or between the identified connective joints;
wherein the analysis of the identified tips and connective joints is based on the determined one or more distances.

30. The method of claim 29, wherein determining the subset of points is performed such that the neighboring points of an individual point include one or more of a first point to the left of the individual point, a second point to the right of the individual point, a third point above the individual point, and a fourth point below the individual point, as viewed from a point of view originating at the distancing device.

* * * * *